United States Patent
Li et al.

(10) Patent No.: US 9,183,058 B2
(45) Date of Patent: Nov. 10, 2015

(54) HEURISTICS-BASED SCHEDULING FOR DATA ANALYTICS

(75) Inventors: Wen-Syan Li, Fremont, CA (US); Thomas Phan, Redmond, WA (US)

(73) Assignee: SAP SE, Walldorf (DE)

( * ) Notice: Subject to any disclaimer, the term of this patent is extended or adjusted under 35 U.S.C. 154(b) by 650 days.

(21) Appl. No.: 13/353,109

(22) Filed: Jan. 18, 2012

(65) Prior Publication Data
US 2013/0117752 A1    May 9, 2013

(30) Foreign Application Priority Data
Nov. 7, 2011    (CN) .......................... 2011 1 0347633

(51) Int. Cl.
G06F 9/50    (2006.01)
G06F 11/34    (2006.01)

(52) U.S. Cl.
CPC .......... *G06F 9/5066* (2013.01); *G06F 11/3404* (2013.01); *G06F 2209/501* (2013.01); *G06F 2209/508* (2013.01)

(58) Field of Classification Search
CPC ............................. G06F 9/5066; G06F 11/3404
USPC .......................................................... 718/102
See application file for complete search history.

(56) References Cited

U.S. PATENT DOCUMENTS

| 6,098,091 | A * | 8/2000 | Kisor ............................. 709/202 |
| 6,370,560 | B1 * | 4/2002 | Robertazzi et al. ............ 718/102 |
| 2006/0173723 | A1 * | 8/2006 | Fisher ................................ 705/8 |
| 2008/0049254 | A1 * | 2/2008 | Phan et al. .................... 358/1.16 |
| 2008/0244584 | A1 * | 10/2008 | Smith et al. .................... 718/102 |
| 2009/0241117 | A1 * | 9/2009 | Dasgupta et al. ............. 718/101 |
| 2011/0055843 | A1 * | 3/2011 | Keeton et al. .................. 718/102 |
| 2011/0225277 | A1 * | 9/2011 | Freimuth et al. .............. 709/223 |

OTHER PUBLICATIONS

"Apache Hadoop", The Apache Software Foundation, Jul. 2, 2008, 2 pages.
"Apache Hadoop Hive", The Apache Software Foundation, Dec. 6, 2008, 2 pages.
AWS, "Amazon EC2", available online at <http://aws.amazon.com/ec2/>, 2008, pp. 1-5.
AWS, "Amazon S3", available online at <http://aws.amazon.com/s3/>, 2008, pp. 1-4.
Barroso et al., "Web Search for a Planet: The Google Cluster Architecture", IEEE, 2003, pp. 22-28.
Casanova et al., "Heuristics for Scheduling Parameter Sweep Applications in Grid Environments", IEEE, 2000, pp. 349-363.

(Continued)

*Primary Examiner* — Jaweed A Abbaszadeh
*Assistant Examiner* — Terrell Johnson
(74) *Attorney, Agent, or Firm* — Brake Hughes Bellermann LLP

(57) ABSTRACT

A scheduler may receive a plurality of jobs for scheduling of execution thereof on a plurality of computing nodes. An evaluation module may provide a common interface for each of a plurality of scheduling algorithms. An algorithm selector may utilize the evaluation module in conjunction with benchmark data for a plurality of jobs of varying types to associate one of the plurality of scheduling algorithms with each job type. A job comparator may compare a current job for scheduling against the benchmark data to determine a current job type of the current job. The evaluation module may further schedule the current job for execution on the plurality of computing nodes, based on the current job type and the associated scheduling algorithm.

23 Claims, 9 Drawing Sheets

(56) References Cited

OTHER PUBLICATIONS

Dean et al., "MapReduce: Simplified Data Processing on Large Clusters", 6th Symposium on Operating Systems Design and Implementation, 2004, pp. 137-149.

Decandia et al., "Dynamo: Amazon's Highly Available Key-value Store", SOSP'07, Oct. 14-17, 2007, pp. 205-220.

Goffe et al., "Global Optimization of Statistical Functions with Simulated Annealing", Journal of Econometrics, vol. 60, 1994, pp. 65-99.

GoGrid, "Gogrid", available online at <http://www.gogrid.com/index.v3.php>, 2008.

Goldberg, David E., "Genetic Algorithms in Search, Optimization, and Machine Learning", Addison Wesley, Edition 1, Jan. 1, 1989, 6 pages.

Isard et al., "Distributed Data-Parallel Computing Using a High-Level Programming Language", SIGMOD'09, Jun. 29-Jul. 2, 2009, 8 pages.

Kosar et al., "Stork: Making Data Placement a First Class Citizen in the Grid", ICDC '04, 2004, pp. 1-8.

Mohamed et al., "An Evaluation of the Close-to-Files Processor and Data Co-Allocation Policy in Multiclusters", In Proceedings of the IEEE International Conference on Cluster Computing, Sep. 20-23, 2004, pp. 287-298.

Nabrzyski (Editor) et al., "Grid Resource Management", Kluwer Academic Publishers, 2003, 595 pages.

Phan et al., "Evolving Toward the Perfect Schedule: Co-scheduling Job Assignments and Data Replication in Wide-Area Systems Using a Genetic Algorithm", JSSPP, 2005, pp. 1-13.

Ranganathan et al., "Computation Scheduling and Data Replication Algorithms for Data Grids", 2004, 20 pages.

Russell et al., "Artificial Intelligence (A Modern Approach)", Prentice Hall, Englewood Cliffs, New Jersey 07632, 1995, 946 pages.

Thain et al., "Gathering at the Well: Creating Communities for Grid I/O", SC2001, Nov. 2001, 10 pages.

Thusoo et al., "Hive—A Petabyte Scale Data Warehouse Using Hadoop", IEEE, 2010, pp. 996-1005.

Thusoo et al., "Hive—A Warehousing Solution Over a Map-Reduce Framework", VLDB '09, Aug. 24-28, 2009, 4 pages.

Venugopal et al., "A Taxonomy of Data Grids for Distributed Data Sharing, Management and Processing", ACM Computing Surveys, vol. 38, No. 1, 2006, pp. 1-60.

Wustenhoff, Edward, "Service level agreement in the Data Center", Sun Microsystems, Inc., Apr. 2002, 12 pages.

\* cited by examiner

HEURISTICS-BASED SCHEDULING FOR DATA ANALYTICS

CROSS REFERENCE TO RELATED APPLICATION

This application claims priority under 35 U.S.C. 119 to Chinese Patent Application No. 201110347633.6, filed on Nov. 7, 2011, entitled "HEURISTICS-BASED SCHEDULING FOR DATA ANALYTICS", which is incorporated by reference herein in its entirety.

TECHNICAL FIELD

This description relates to job scheduling.

BACKGROUND

It is often difficult for users of computing resources to utilize such computing resources in an efficient, cost effective manner. For example, such users may have computing needs which vary greatly in time, and may not wish to invest in a quantity of computing resources necessary to manage computational loads during periods of high usage. For example, a business with a large number of employees may wish to process payroll for all employees only once, e.g., at the end of each month. In such scenarios, the business may require computing resources at the end of each month in a quantity that is disproportionate to computing resources needed during the remainder of the month. Consequently, it may be inefficient for the business to invest in sufficient computing resources to handle the payroll processing of the above example, since a significant portion of such computing resources would sit idle during the remainder of the month. In these and other scenarios, users of computing resources may be unwilling or unable to bear the costs associated with purchasing and managing a level of computing resources necessary to meet all of the user's computing needs.

Therefore, providers of software, infrastructure, and other computing resources have implemented a business model in which computing resources are provided to users on an as-needed, on-demand, dynamic basis, according to the particular and fluctuating demands of the customers of such providers. Such providers are known as, or may be referred to as, "software as a service" (Saas) providers, and/or "infrastructure as a service" (Iaas) providers. Such providers typically invest in the relatively large amount of servers and related computer/network equipment needed to remotely provide computing resources to their customers. For example, in the example described above, the business with the described payroll processing needs may have an agreement in place with a Saas provider to utilize a relatively low amount of computing resources through much of the month, and to have access to a relatively larger amount of computing resources at the end of each month when payroll processing occurs.

Thus, such service providers may provide software, infrastructure, and other computing resources to a large number of businesses or other customers, and may therefore bear the burden of utilizing available computing resources in an efficient, cost effective manner. In order to do so, such service providers typically receive requests for computing resources, and dynamically schedule the received requests among available servers or other computing nodes. In many cases, such service providers may deploy a very large quantity of computing resources, and may have service agreements in place with a relatively large number of service consumers, each of which may require varying and potentially large amounts of the available computing resources. As a result, it may be difficult for service providers to allocate the available computing resources in a desired, efficient, and cost effective manner.

SUMMARY

According to one general aspect, a computer system may include instructions recorded on a computer-readable medium and executable by at least one processor. The system may include a scheduler configured to cause the processor to receive a plurality of jobs for scheduling of execution thereof on a plurality of computing nodes, and an evaluation module configured to cause the processor to provide a common interface for each of a plurality of scheduling algorithms. The system may further include an algorithm selector configured to cause the processor to utilize the evaluation module in conjunction with benchmark data for a plurality of jobs of varying types to associate one of the plurality of scheduling algorithms with each job type, and a job comparator configured to cause the processor to compare a current job for scheduling against the benchmark data to determine a current job type of the current job. The evaluation module may be further configured to schedule the current job for execution on the plurality of computing nodes, based on the current job type and the associated scheduling algorithm.

According to another general aspect, a computer-implemented method may include receiving a plurality of jobs for scheduling of execution thereof on a plurality of computing nodes, and providing a common interface for each of a plurality of scheduling algorithms. The method may include utilizing the common interface in conjunction with benchmark data for a plurality of jobs of varying types to associate one of the plurality of scheduling algorithms with each job type, and comparing a current job for scheduling against the benchmark data to determine a current job type of the current job. The method may further include scheduling the current job for execution on the plurality of computing nodes, based on the current job type and the associated scheduling algorithm.

According to another general aspect, a computer program product may be tangibly embodied on a computer-readable medium and may include instructions that, when executed, are configured to receive a plurality of jobs for scheduling of execution thereof on a plurality of computing nodes, and provide a common interface for each of a plurality of scheduling algorithms. The instructions, when executed, may be further configured to utilize the common interface in conjunction with benchmark data for a plurality of jobs of varying types to associate one of the plurality of scheduling algorithms with each job type, and compare a current job for scheduling against the benchmark data to determine a current job type of the current job. The instructions, when executed, may be further configured to schedule the current job for execution on the plurality of computing nodes, based on the current job type and the associated scheduling algorithm.

The details of one or more implementations are set forth in the accompanying drawings and the description below. Other features will be apparent from the description and drawings, and from the claims.

DETAILED DESCRIPTION

Figure 1:
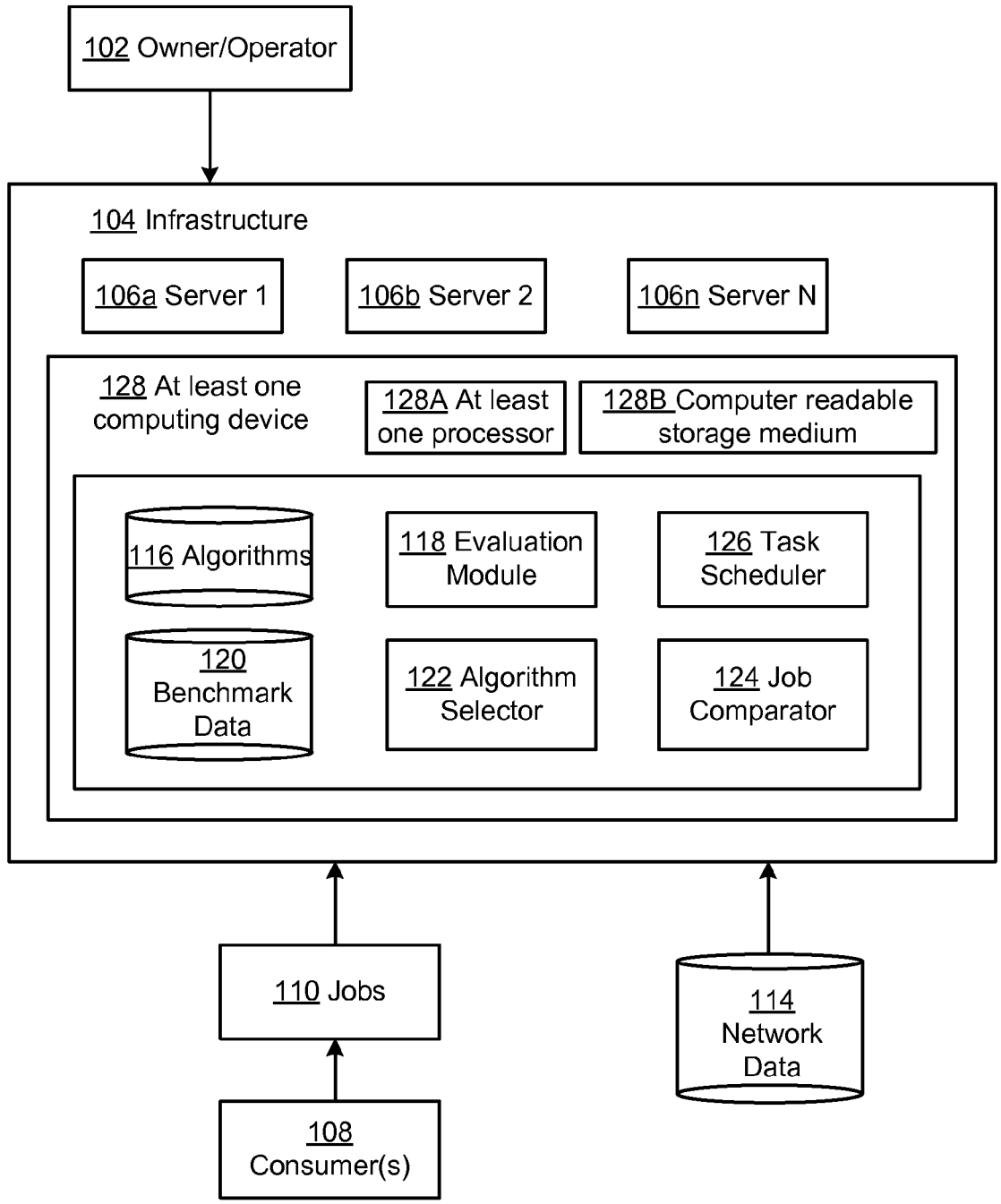
FIG. 1 is a block diagram of a system for performing heuristics-based scheduling for data analytics.

FIG. 1 is a block diagram of a system 100 for performing heuristic space scheduling for data analytics. In the example of FIG. 1, an owner and/or operator 102 is illustrated as managing and maintaining an infrastructure 104 of computing resources. In the simplified example of FIG. 1, the infrastructure 104 is illustrated as including a plurality of servers 106A, 106B, . . . 106N. In the example, consumers 108 of services provided by the owner/operator 102 of the infrastructure 104 submit jobs 110 to be completed using the servers 106A, 106B, . . . 106N and other relevant computing resources associated with the infrastructure 104. More specifically, as described in detail herein, a scheduler 112 associated with the infrastructure 104 may be configured to receive jobs 110 and to distribute the jobs 110 across the servers 106A, 106B, . . . 106N in a manner which accomplishes one or more desired goals of the owner/operator 102.

In the example of FIG. 1, the owner/operator 102 may represent any person, business, or other entity which seeks to provide computing resources to the consumers 108, e.g., as a means of earning a profit thereby. For example, the owner/operator 102 may represent a business entity specializing in the remote provisioning of software, or may represent a business which has excess computing capacity which the business then uses to provide computing resources to the consumers 108.

As referenced above, the simplified example of FIG. 1 illustrates the infrastructure 104 as including the servers 106A, 106B, . . . 106N. Of course, the infrastructure 104 may include many additional or alternative elements, not specifically illustrated in the example of FIG. 1, some of which are described in more detail, below. For example, it may be appreciated that the servers 106, 106, . . . 106N may represent virtually any computing device, node, or cluster thereof which may be configured to provide remote data storage and processing to the consumers 108. Thus, for example, the infrastructure 104 may be understood to include various network connections for providing communication between and among the servers 106, 106B, . . . 106N, as well as between the servers 106A, 106B, . . . 106N and the scheduler 112, and also between the infrastructure 104 and any and all data accessed over one or more networks external to the infrastructure 104. Moreover, the infrastructure 104 may be understood to include, or be in communication with, one or more computer memories utilized by the servers 106A, 106B, . . . 106N in storing data associated with the jobs 110 and/or on behalf of the consumers 108. As would be apparent to one of skill in the art, the such memories may be associated with the servers 106A, 106B, . . . 106N in a one to one, one to many, many to one, or many to many relationship.

The consumers 108 may represent virtually any person, business, or other entity which sends the computing jobs 110 to the infrastructure 104 for utilization of computing resources of the infrastructure 104 in conjunction therewith. For example, as described in the examples above, the consumer 108 may represent a business having variable processing needs, e.g., payroll processing. In some example scenarios, the consumer 108 may represent an owner of an independent infrastructure (not illustrated in FIG. 1), i.e., may itself be a provider of software and/or infrastructure as a service. In such examples, a consumer 108 may be unable to meet a level of demand of its own consumers, and may therefore utilize computing resources of the infrastructure 104 provided by the owner/operator 102 in order to meet its own customer demands.

The jobs 110 may represent virtually any request for a computing-related task that may be submitted by the consumers 108 to the infrastructure 104, e.g., over an applicable computer network. For example, the jobs 110 may include one or more requests for specific computations to be performed with respect to one or more datasets. In other example implementations, the jobs 110 may include requests for temporary or long term storage of data.

In many cases, receipt and processing of the jobs 110 may be governed by a service level agreement (SLA) between the owner/operator 102 and each of the consumers 108. For example, such SLAs may dictate a priority of each job, relative to other jobs or job types received from a single consumer 108 and/or relative to other jobs or job types received from other/different consumers 108. Somewhat similarly, such SLAs may govern a relative availability of computing resources of the infrastructure 104 with respect to each consumer 108. Further, such SLAs may be associated with cost-based measures governing availability and processing times associated with the computer resources. For example, the SLA may dictate that the consumer 108 may receive more availability and/or processing times in exchange for increased cost. Other example terms and characteristics of such SLAs are well known, and are only described herein in additional detail to an extent necessary or helpful understanding features and functions of the system 100 of FIG. 1.

As described in detail below, e.g., with respect to FIG. 2A, each of the jobs 110 may include a plurality of tasks or subtasks which are individually associated with specific computing requirements. Thus, as also described in detail below, data required by a given job 110 may be received in conjunction with receipt of the job 110, may be received in conjunction with completion of an earlier task of the job 110, or, as illustrated in the example of FIG. 1 and described in more detail below, e.g., with respect to FIG. 2B, may include network data 114 or other data which is at least initially external to, or separate from, the corresponding job 110.

The scheduler 112 may thus be configured, as referenced above and described in more detail below, to receive the jobs 110 and to distribute the jobs 110 within and among the servers 106A, 106B, . . . 106N. In so doing, the scheduler 112 may be configured to distribute the jobs 110 in a manner which satisfies the various SLAs between the consumers 108 and the owner/operator 102, and which otherwise partially or completely accomplishes one or more goals of the owner/operator 102.

For example, the owner/operator 102 may wish to configure the scheduler 102 to distribute the jobs 110 in a manner which minimizes an execution time of the jobs 110. In so doing, the owner/operator 102 may achieve a high level of satisfaction of the consumers 108, who generally may be presumed to desire to have their respective jobs 110 completed as quickly as possible.

On the other hand, it may occur that minimizing an execution time of the jobs 110 may be associated with an under-utilization of resources of the infrastructure 104. For example, scenarios may exist in which the owner/operator 102 may wish to maximize utilization of the servers 106A, 106B, . . . 106N, even at the cost of somewhat reducing an overall execution time of the jobs 110. For example, such an outcome may be satisfactory to the owner/operator 102, as long as the relevant execution times are within the parameters dictated by the various SLAs negotiated with, and purchased by, the consumers 108.

Thus, it may be observed that a number of dynamic variables exist which govern a manner in which the scheduler 112 distributes the jobs 110. Of course, many other such variables exist and would be known to one of skill in the art, and are therefore not described herein in further detail. For example, such variables may include a current/changed number of available servers (e.g., such as when new servers are added and/or when one or more servers experiences a failure).

Moreover, in many cases, it may occur that a total number "N" servers and a total number of jobs 110 may be quite large. Further, it may be observed that a number of possibilities for distributing the jobs 110 among the N servers grow exponentially with the addition of further jobs/servers.

Thus, a function of the scheduler 112 may be understood to be an identification of the distribution of the jobs 110 from among all possible or potential distributions which best satisfy relevant SLAs and/or which otherwise accomplishes desired goals of the owner/operator 102. However, as just described, a search space of possible distributions of the jobs 110 required to be searched by the scheduler 112 to identify the best possible distribution may be too large for the scheduler 112 to accomplish the identification within a practical time limit.

Thus, the scheduler 112 includes a plurality of algorithms 116 which are designed to assist the scheduler 112 in investigating a search space of possible distributions of the jobs 110, and in thereby identifying a best, nearly best, or acceptable distribution of the jobs 110. Moreover, the scheduler 112 includes an evaluation module 118 which is configured to provide a common interface with, or which otherwise has an ability to communicate with, all of the various algorithms 116. That is, the evaluation module 118, as described in more detail below, may be configured to evaluate and compare various potential job distributions, using any one of the algorithms 116, and relative to a desired goal of the owner/operator 102. For example, the evaluation module 118 may be configured to evaluate possible job distributions relative to one another and with respect to a desired minimization of an overall job execution time, a desired maximization of utilization of resources of the infrastructure 104, or other metric(s), or combinations thereof.

As described in detail below, each of the algorithms 116 may be particularly well-suited to search for an identified desired job distribution in a particular, corresponding context. For example, the jobs 110 may have varying characteristics and/or types, and particular ones of the algorithms 116 may be well-suited to select or identify a desired job distribution for jobs of a corresponding type or having corresponding characteristics.

Somewhat similarly, in additional or alternative examples, particular ones of the algorithms 116 may be particularly useful in determining a desired job distribution in the presence of the external network data 114, dependent upon a type or extent of the external network data 114. In still further examples, particular ones of the algorithms 116 may be relatively more useful in scenarios in which a relatively small number of jobs 110 are to be distributed among a relatively small number of servers, while other ones of the algorithms 116 may be well-suited for selecting/identifying a job distribution in the presence of a large number of jobs 110 to be distributed over a large number of servers. Nonetheless, because the evaluation module 118 is configured to interoperate with any and all of the algorithms 116 in a fast, efficient, and practical manner, the scheduler 112 may be configured to select and utilize an available algorithm from the algorithms 116 in order to implement a current distribution of the jobs 110.

Specifically, as shown, the scheduler 112 may accumulate benchmark data 120 which includes collected data and other related heuristics associated with previous calculations of job distributions. For example, in some implementations, the benchmark data 120 may be collected by the scheduler 112 over time, in conjunction with normal operations of the scheduler 112. In additional or alternative examples, the benchmark data 120 may be collected in conjunction with operations of the scheduler 112 which are implemented specifically for the purpose of collecting the benchmark data 120.

Thus, the benchmark data 120' may generally be understood to include, e.g., previous job distribution processes conducted by the scheduler 112, along with related data which may be useful in selecting an algorithm 116 for use in conducting a current or future job distribution. For example, the benchmark data 120 may include data related to a name, nature, type, or other characteristic of relevant jobs included in the benchmark job distribution. The benchmark data 120 also may include performance data related to subsequent computing operations performed in accordance with the resulting, selected job distribution.

Thus, in a specific example, one or more sets of jobs 110 may initially be used to create the benchmark data 120. For example, initial jobs 110 may be received by the scheduler 112 and scheduled using any and all applicable algorithms of the algorithm 116, i.e., using the evaluation module 118 as a common middleware for implementing the algorithms 116 with respect to the initial set of jobs 110. Then, an algorithm selector 122 may evaluate the resulting job distributions associated with the various algorithms 116, e.g., may evaluate a length of time required by each algorithm to select a resulting job distribution, and/or may evaluate a resulting computing time, utilization measure, or other metric associated with the completion of the initial set of jobs. In this way, the algorithm selector 122 may select a particular one of the algorithms 116, and may store the algorithm 116 in conjunction with related job/performance data within the benchmark data 120.

Then, when a current or a future set of jobs 110 is received, a job comparator 124 may be configured to analyze the received jobs 1.10 relative to the benchmark data 120, whereupon the algorithm selector 122 may be configured to select an algorithm from the algorithms 116 which is determined to be best-suited for conducting a distribution of the current set of jobs 110. Once selected, the selected algorithm 116 may be utilized by the evaluation module 118 to proceed with conducting the identification and selection of a job distribution to be used in assigning the jobs 110 within and among available ones of the servers 106A, 106B, . . . 106N. In this way, the scheduler 112 provides a customized, optimized, dynamic technique for distributing the jobs 110 in a manner which is most likely to accomplish desired goals of the owner/operator 102 and/or the consumers 108.

Finally with respect to the scheduler 112 of FIG. 1, a task scheduler 126 is illustrated which may be configured to arrange individual tasks of one or more of the jobs 110 for execution thereof on an individual, assigned one of the servers 106A, 106B, ... 106N. That is, as described herein, the jobs 110 may each include a plurality of separate, discrete tasks. Each task may be processed using, e.g., data received from a previously completed task, and/or using the external network data 114. Consequently, once operations of the evaluation module 118 are completed and the jobs 110 are distributed, each server which receives one of the jobs 110 may proceed with execution of the tasks thereof.

However, if there is a delay in executing a specific one of the tasks, such as may occur when an executing task requires external network data 114 which is not currently available, then an overall delay in operations of the relevant server may be experienced. Consequently, the task scheduler 126 may be configured to reschedule individual tasks being implemented by a specific server, so as, for example, to begin execution of an otherwise subsequent task if and when a current task experiences a delay, such as just described. In particular, the task scheduler 126 may be configured to use any one or more of the algorithms 126, as described herein, to execute such scheduling/re-scheduling operations. In this way, operations of the infrastructure 104 may be further optimized. Specific example operations of the task scheduler 126 are described in detail below, e.g., with respect to FIGS. 7 and 8.

In the example of FIG. 1, the scheduler 112 is illustrated as being executed by at least one computing device 128. As illustrated, the at least one computing device 128 may include at least one processor 128A, as well as a computer readable storage medium 128B. Thus, for example, it may be appreciated that many different implementations of the scheduler 112 are contemplated by the example of FIG. 1. For example, although the scheduler 112 is illustrated in FIG. 1 as executing on a single computing device, it may be appreciated that various modules and associated functions of the scheduler 112 may be implemented using different computing devices, which may be in communications with one another. Somewhat similarly, it may be appreciated that the scheduler 112 may be implemented on a single computing device having a plurality of processing cores, so that operations of the scheduler 112 may be implemented using parallel processing and associated techniques.

Further, although illustrated on the at least one computing device 128 as being separate from the servers 106A, 106B, ... 106N, it may be appreciated that the scheduler 112 may be implemented on, or using, one or more of the various servers or other computing nodes of the infrastructure 104. Finally with respect to FIG. 1, although the scheduler 112 is illustrated and described as including various separate, discrete components, it may be appreciated that functionality of any one of the illustrated components 116-126 may be implemented using two or more subcomponents. Conversely, it may be appreciated that functionalities of any two or more of the components 116-124 may be implemented using a single component. Thus, many possible variations of the system 100 of FIG. 1 may be implemented by one of skill in the art, some examples of which are provided below in more detail with respect to FIGS. 2A-8.

Figure 2A:
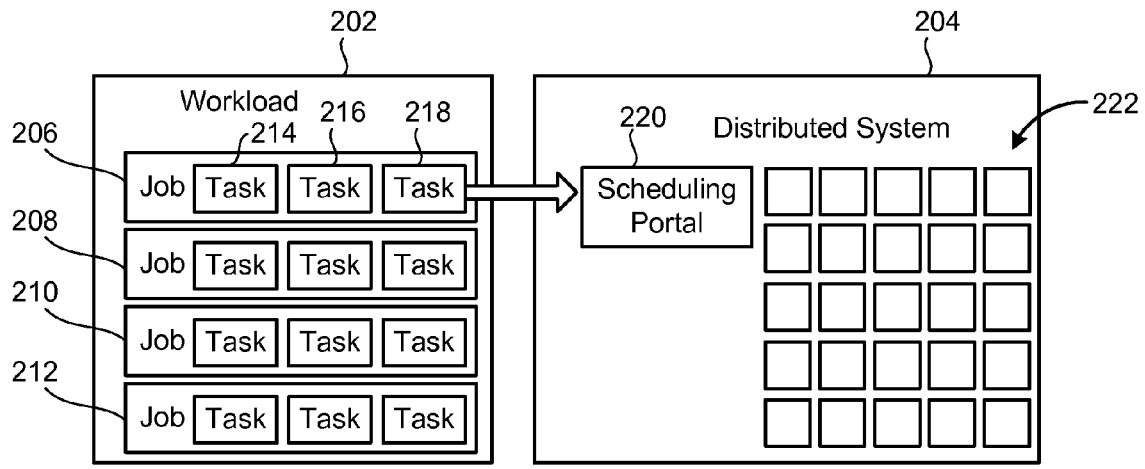
FIG. 2A is a block diagram illustrating job distribution in the system of FIG. 1.

Referring first to FIG. 2A, a workload 202 is illustrated as being provided to a distributed system 204. As shown, the workload 202 includes jobs 206, 208, 210, 212. Each job includes tasks, e.g., the job 206 includes tasks 214, 216, 218. a scheduling portal 220 accepts the incoming job submission requests, pre-processes the jobs 206-212, and dispatches them onto the distributed system 204, i.e., to nodes 222.

As may be appreciated from the above description of FIG. 1, the scheduling portal 220 in the example of FIG. 2A may represent or include the scheduler 112 of FIG. 1. The portal 220, as shown, accepts incoming jobs, pre-processes or compiles the queries, and dispatches the jobs onto the computation nodes 222. The portal 220 may itself be a distributed component, but for purposes of this description, only the portal's scheduling responsibilities are described, while specific details of internal implementation of the scheduling portal 220 are not described here in detail.

For purposes of the non-limiting examples described herein, as just referenced, a job comprises multiple tasks. For example, a query/rocessing request can have its individual statements be compiled down to physical operators, such as reading from logs, performing map-reduce execution, and writing to an output. The tasks of each job are assumed to form a directed acyclic graph (DAG) with respect to other tasks of the same job.

Figure 2B:
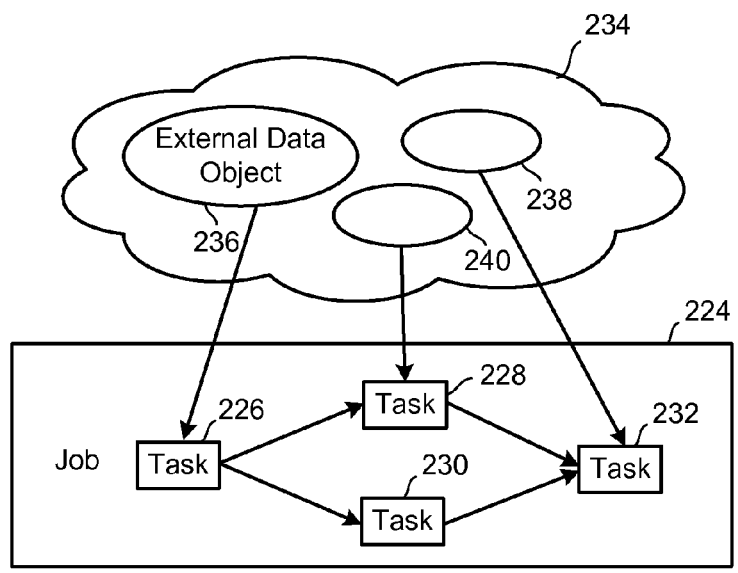
FIG. 2B is a block diagram illustrating example arrangements of job tasks and data sources thereof.

Each task in a job can take two forms of input: (1) the output of an upstream task and (2) external data objects read from outside the distributed computing system, such as data being read from an external SQL database or a file being read from a web or FTP server. For (2), data is cached locally and can be reused by a subsequent task executing on the same node, but network transmission delay is incurred for the initial fetch. FIG. 2B illustrates an example job 224 with tasks 226, 228, 230, 232 forming a DAG in which tasks 228, 230, 232 receive data from preceding tasks, and tasks 226, 228, 232 receive data from external data objects 236, 238, 240 of a network 234. Tasks in the graph can be configured to executed serially, but a complex graph can be executed so long as it remains a DAG configuration. Task input and output can branch; for example, a task performing a join operation can take multiple inputs and a task performing a partitioning can produce multiple outputs.

For purposes of example, different jobs may share the same task; for example, a stored procedure to perform a complex calculation may be re-used by different jobs. Once tasks are assigned to a compute node, the node executes the tasks sequentially, where each task is given maximum user-mode CPU utilization on that server (aside from whatever cycles are given to the operating system and middleware components).

Arriving tasks at the portal are enqueued in FIFO order, and scheduling is performed one workload at a time. That is, at periodic intervals, all jobs currently in the portal's queue are scheduled to be run, which is an approach which allows the scheduler 220 to perform a tight packing of tasks onto the compute nodes 222. Jobs that arrive while the current workload is executing will be enqueued for the next periodic iteration of the scheduler.

Thus, the system of FIG. 1 operating in the context of the examples of FIGS. 2A-2B may be configured to consider not only the job/task execution time, but also a data load time from client sites to the execution platform hosted by the SaaS/IaaS providers. Further, the system 100 of FIG. 1 provides resource-level scheduling for concurrent execution of multiple jobs/tasks in order to maximize the throughput of the computation platform. Still further, the system 100 of FIG. 1 takes into consideration the competitive deadline of each job scheduling at the job level, and can be used as a system level scheduling tool as well as by the IaaS providers to maximize usage of their computation capacities.

Figure 3A:
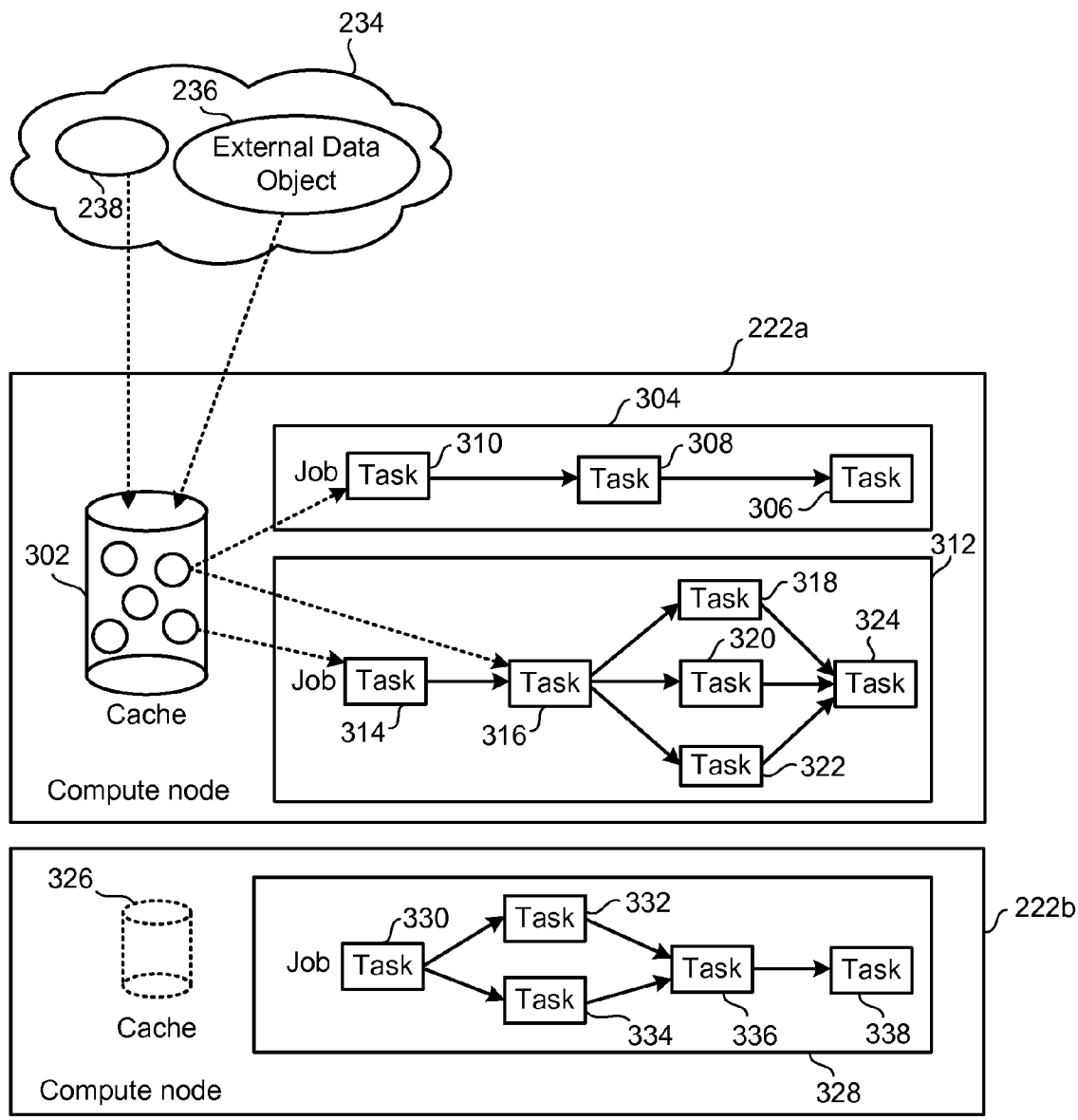
FIG. 3A is a block diagram illustrating job placements in which all tasks of a job are assigned to a single node.

As shown in FIG. 3A, and described below, a placement of jobs onto servers impacts the execution of the tasks and, as a result, the workload as a whole. In the example embodiment of FIG. 3A and related examples described herein, it is assumed that all tasks 306-310, 314-324, 330-338 of the same job 304, 312, 328, respectively, are assigned to the same server 222a, 222b, as shown, where the configuration of the task instances must conform to a directed acyclic graph. External data objects are cached on-demand using caches 302, 326, and can be reused by multiple tasks.

Figure 3B:
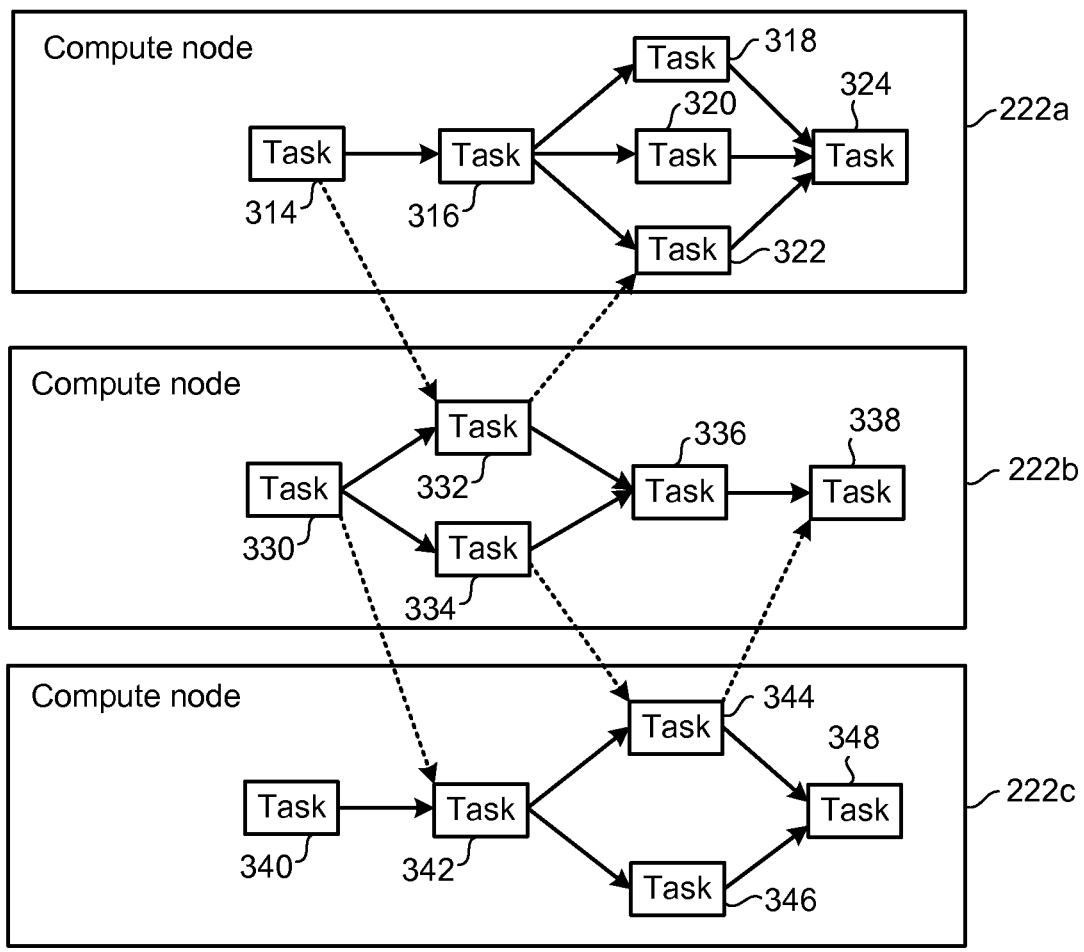
FIG. 3B is a block diagram illustrating job placements in which tasks of a job are independently assigned among a plurality of nodes.

In alternative examples, FIG. 3B illustrates an alternative execution model where tasks 314-324, 330-338, and 340-348, rather than jobs, are the units of work that are assigned by the scheduler 220 respectively to compute nodes 222a, 222b, 222c such that the task execution continues to conform to the DAG restriction. This mode of execution provides an additional degree of freedom for the scheduler 220 to leverage more parallelism. Specifically, for example, since tasks are placed without restriction, there would then be ST possible placements (of T tasks onto the S servers) rather than $S_J$ possible placements (of J jobs onto the S servers). Aside from the degenerate case where a job comprises only one task, the number of tasks T is greater than the number of jobs J as defined herein. In the example of FIG. 3B, dashed lines indicate cross-node data communication between an upstream producer and a downstream consumer. Also in FIG. 3B, particular tasks may belong to different jobs, and, again, need not be located on the same node as the other tasks of corresponding jobs.

Thus, the execution model of FIG. 3B allows for more flexibility for scheduling and more opportunities for parallelism, but the cost of runtime orchestration may be higher. Dependencies between upstream producers and downstream consumers becomes more complicated; e.g., since the nodes are shared-nothing, any results from a producer may need to be transferred over the network to a consumer that resides on a different node. This approach might be preferable, e.g., in instances where the consumer takes multiple inputs, and where co-location of the consumer on a node where another cached data object or another upstream producer is located may outweigh the cost of cross-node communication.

Thus, with reference to FIGS. 1-3B, it is the goal of the scheduling portal 220 (and/or 112) to place tasks onto compute nodes in such a manner that the placement optimizes some metric. As examples described herein, the scheduler 220 is described as optimizing against either or both of two metrics. Specifically, a first metric is a workload completion time (commonly called the makespan). The scheduler 220 attempts to minimize the workload completion time as a whole, where the completion time is defined as the time that the last job in the workload completes. A second metric is a business value, for which a business value is assigned for each task's completion based on some agreed-upon service-level agreement (SLA) between the users and the infrastructure owner.

As referenced above, SLAs, by themselves, are well-known. For purposes of this description, it is assumed that the agreement is defined in terms of a generic business value metric that allows users to prioritize the scheduling preference of their jobs in a clear manner. The per-job metric may be written in terms of corresponding constants, e.g., (i) a wallclock soft deadline; (ii) a wallclock hard deadline; (iii) a positive business value α (e.g, if the task completes before the deadline); (iv) a negative business value β (e.g., if the task completes at/after the soft deadline and before the hard deadline; and (v) a negative business value (e.g., if the task completes at/after the hard deadline.

For example, by placing a large positive value for a and a large negative value for γ, the user can define that the job should be given high scheduling preference. The illustrated scheduling design can be configured to optimize against either workload completion time or business value, e.g., by virtues of the evaluation module 118 and other features and functions of the system 100 of FIG. 1. For the sake of consistency, the present description optimizes by finding a minimum in either case, even though technically speaking, the business value metric leads to higher numerical business values being more beneficial, so in the examples the negation of the business value may be minimized.

Other optimization metrics may be used. For example, a weighted combination of the makespan and business value result may be used. Such a combination may provide weighted coefficients which the users or the providers can change to fit their needs.

The solution space for assigning jobs/tasks to nodes 222 encompasses situations, e.g., where tasks of the same job can be either co-located on the same server or placed on separate servers. In the former case, or where data can be sent from one task to the next directly, either directly through memory or through an intermediary file. In the latter case, data must be sent between tasks over the network, which is slower in most cases but allows tasks to be executed in parallel within the tasks' DAG structure. In the present description, the first case is assumed in which all tasks of a job must be placed together on the same server (e.g., the example of FIG. 3A).

FIG. 3A illustrates an impact of job placement on the execution of the tasks. Since all tasks of the same job must be assigned to the same server in the example of FIG. 3A, there is no possibility of dangling tasks that wait for non-existent upstream tasks that failed to be placed onto the same compute node. Additionally, as mentioned previously, tasks executing as part of a DAG configuration for a given job can be reused in the same job or other jobs. Furthermore, as also shown in FIG. 3A, tasks may be assigned so as to be co-located with the data they consume.

As also described, each task may read data from an upstream sources and can download external data objects; in both cases, if the task is re-used by multiple jobs (or is re-used in the same job but as a different instance of the task), then it is beneficial to have producing and consuming tasks co-located as well as external data objects and the tasks that read them.

Equations 1-6 represent examples of formulae with the objective of minimizing the makespan, and may be used to examine how the decisions of the scheduler 220 affect this value. For example, Let Ps be the execution time of server s from the set of servers S. The makespan is defined as the longest server completion time, as shown in Equation 1:

$$\text{makespan} = \underset{s \in S}{\text{MAX}}(P_s) \qquad \text{Equation 1}$$

Let $T_s$ be the set of task instances t assigned to a server s. The execution time of each server is then the aggregate sum of, over all Pt, the completion time for an individual task t, as shown in Equation 2:

$$P_s = \sum_{t \in T_s} P_t \qquad \text{Equation 2}$$

The execution time $P_t$ for a task may include several components. For example, if $L_t$ is the time to download each external data object required by the task, $C_t$ may be the time to execute its computation, and At may be a stepped indicator function that indicates whether or not data from upstream tasks is available, as shown in Equation 3:

$$P_t = (L_t + C_t) \cdot A_t \qquad \text{Equation 3}$$

For purposes of the examples, a time to download an external data object may be assumed to be dominated by the network transmission delay $P_d$ for that object. Also, the system caches each data object so that other tasks can reuse it, as described herein.

Then, if $I_d$ is a boolean indicator function that is 1 if d is in the cache and 0 otherwise, then a resulting time $L_t$ to acquire all external data objects for a task is then a sum over all data objects d in the set of needed data objects Dt for the task, as shown in Equation 4:

$$L_t = \sum_{d \in D_t} I_d \cdot P_d \qquad \text{Equation 4}$$

The availability of data from upstream tasks is represented by the indicator function $A_t$, as shown in Equation 5. If $U_t$ is the set of upstream tasks needed by a task t, and u is one task from this set, and if $1_u$ is a boolean indicator function with a value of 1 if upstream task u was scheduled before the task and 0 otherwise, then an availability function $A_t$ of Equation 4 is then 1 if all upstream tasks were run already and 1 if not, where the latter case's value indicates that the task waits for an infinite amount of time because its upstream data is not available. In programmatic terms, this value is represented by a large value (such as MAX INT) that would allow the scheduler to easily pick lower-valued results for the overall makespan.

$$A_t = \begin{cases} 1 & \text{if } \prod_{u \in U_t} I_u = 1 \\ \infty & \text{otherwise} \end{cases} \qquad \text{Equation 5}$$

The makespan is then the sum of the components, as shown in Equation 6:

$$\text{makespan} = \underset{s \in S}{\text{MAX}} \sum_{t \in T_s} \left( \sum_{d \in D_t} I_d \cdot P_d + C_t \right) \cdot A_t \qquad \text{Equation 6}$$

The makespan formulation described above illustrates impact of the decisions of the scheduler 220. For example, to allow tasks to consume data from its needed upstream tasks, the scheduler 220 should place jobs onto the same processing node so that the needed tasks are placed together. If a task is placed onto a compute node without a needed upstream task, then the task will not complete, which would result in At=1. However, the fact that all tasks of the same job are assumed to be assigned to the same server implies that At will always be 1. Furthermore, since the system caches external data objects, it is beneficial to co-locate tasks that share similar needed data objects so that the network transmission cost is not incurred more than once. A good schedule will produce a high number of co-locations, which will reduce Lt, the time to acquire these external objects. In the most degenerate case, all tasks are placed onto only one server, which maximizes co-location. On the other hand, the scheduler 220 is given the flexibility to distribute jobs (and their tasks) across multiple servers so that they can run in parallel. This parallelism is manifest in the formulation by taking the maximum value over the summation over all tasks t in the set Ts assigned to a given server. If the tasks are spread out evenly, then each server will have an equal number of tasks.

Given this formulation, the objective of the scheduler 220 is then to find the job placements that minimize the makespan. However, as referenced above, for J unique jobs, and S unique server nodes, the search space of the scheduler is exponential in the number of jobs. Assuming all tasks of the same job are assigned to the same server, there are then $S^J$ placements of the J jobs onto the S servers. Within this search space is the optimal placement that satisfies the scheduler's goals. However, this exponential search space becomes too large for exhaustive search even in the smallest typical cases of S and J.

Figure 4:
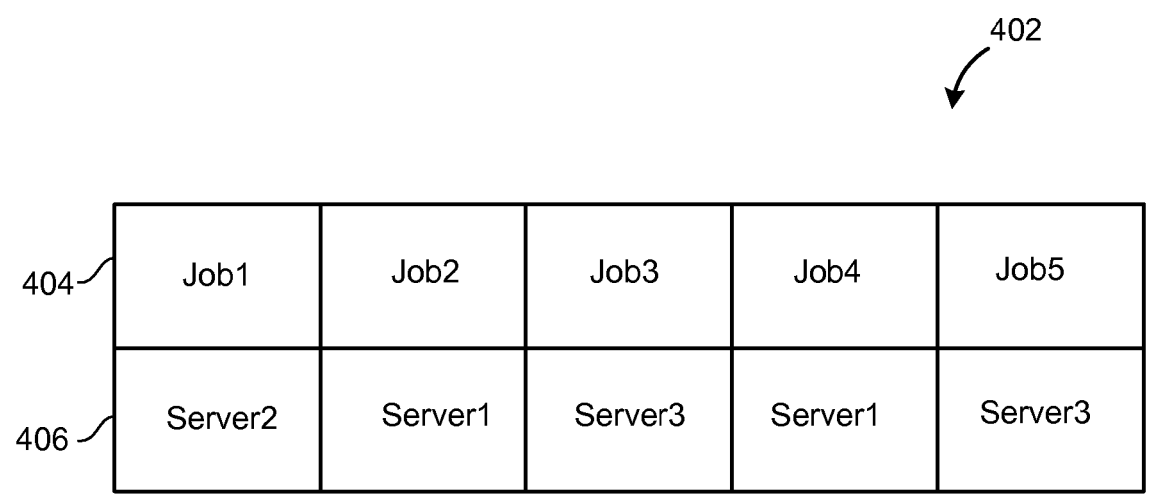
FIG. 4 is an array representing a scheduling result that may be used in conjunction with scheduling algorithms of FIG. 1.

FIG. 4 illustrates possible candidate solutions represented by an array 402. The length of the array is the number of jobs (assuming all tasks of a job are placed on a single server), as shown in row 404, and the value in array element i is the unique identifier for any of the S possible servers to which job i is assigned, as shown in row 406. For example, in FIG. 4, the first (leftmost) array position, array[1]=2, indicates that job 1 is assigned to server 2.

As referenced above with respect to FIG. 1, and described and illustrated in more detail below with respect to FIGS. 5 and 6, the system 100 may use a number of different scheduling algorithms 116. A number of example algorithms are provided below; however, it may be appreciated that additional or alternative example algorithms may be used as well.

One example algorithm is an exhaustive search (EXH) algorithm. Exhaustive search is guaranteed to find the optimal solution in the search space by iterating through all possible placements of jobs to the server nodes. As mentioned, this approach does not scale well when the search space is exponentially large.

A greedy approximation heuristic (GREEDY) approximation is fast to determine and produces reasonably good results. For example, a greedy heuristic may be useful where each job in the workload is stable-sorted by hard deadline and then soft deadline; then the resulting ordered jobs may be assigned round-robin across the servers. This approach is greedy because at any given placement decision, the job is assigned to a server without regard to previous or future decisions.

Purely random assignments (RAND) involve repeatedly evaluating random job assignments to servers, and is the first of four different random-search heuristics provided herein. As shown in Algorithm 1, RAND proceeds in the following manner: (1) Choose a random job placement as the initial best result and evaluate it according to the optimization criteria. (2) Choose another random job placement; if the resulting evaluation value is less than the value from the previous step, then this job placement is the new optimum. (3) Repeat step (2) for a fixed number of rounds. RAND is fast to execute and explores a wide range of regions in the search space, however it does not take advantage of clustered neighborhoods where a good solution leads to an adjacent better solution in the search space.

Algorithm 1 Random optimization

1: FUNCTION Random Optimize
2: BEGIN
3:   Solution best := new random Solution
4:
5:   while i < ITERATIONS do
6:     Solution current := new random Solution
7:     if (current.score < best.score) then
8:       best := current

| Algorithm 1 Random optimization |
| --- |
| 9:    end if<br>10: end while<br>11:<br>12: return best<br>13: END |

Steepest-ascent hill climbing with random restart (HC), an example of which is shown in Algorithm 2, tries to take advantage of neighboring solutions in the search space. Like RAND, it repeatedly evaluates candidate solutions and compares them to the best solutions in the previous round to determine the final best solution, but at each iteration, a "neighborhood" of candidate solutions is evaluated at a time, with the best-scoring solution in the neighborhood being selected as the current best solution in the next round. The next neighborhood is found by mutating the current best solution in a deterministic fashion. To find the neighborhood of a given candidate solution, new neighbors are created by incrementing and decrementing each array element by one. For an array of length N, therefore, 2N neighbors may be formed. HC is called "steepest-ascent" because the best-scoring neighbor is picked to serve as the best solution for the next round. Additionally, or alternatively, a random restart may be implemented, where if the neighbors become homogeneous, the resulting solution is saved and a random restart of the HC algorithm from another location is executed. Then, after a fixed number of such restarts, the best solution across all retries is selected.

| Algorithm 2 Hill Climbing with random restart |
| --- |
| 1: FUNCTION Hill Climbing<br>2: BEGIN<br>3: Solution best := RunOneHCIteration( )<br>4: while i < NUMRESTARTS do<br>5:    Solution current := RunOneHCIteration( )<br>6:    if (current.score < best.score) then<br>7:        best := current<br>8:    end if<br>9: end while<br>10: return best<br>11: END<br>12:<br>13: FUNCTION RunOneHCIteration<br>14: BEGIN<br>15: Solution best := new random Solution<br>16: while (!done) do<br>17:    SolutionList neighbors := best.GetNeighbors( )<br>18:    Solution current := neighbors.GetBest( )<br>19:    if (current.score < best.score) then<br>20:        best := current<br>21:    else<br>22:        done := true<br>23:    end if<br>24: end while<br>25: return best<br>26: END |

A genetic algorithm (GA) simulates natural selection by repeatedly having members of a population compete against each other over several generations, where the highest-evaluating population member of the last generation is chosen as the best solution. At a high level, the algorithm proceeds as shown Algorithm 3. Specifically, an initial population of candidate solutions is chosen. The population is then culled for the top-N best candidates to serve as parents for the next generation. Candidate solutions are interbred using inspiration from biological chromosome combination to produce a new population of children, and the cycle continues for a fixed number of generations. In example implementations, a two-point crossover technique may be used between two parent solutions to produce a child solution. Two cut points are randomly chosen in the solution array of FIG. 4. Array elements from the first parent between the two cut points, inclusive, and array elements outside the cut points from the second parent are given to the child. To increase the range of solutions in the search space that we explore, mutation may be included, where a produced child will undergo a random numerical change to a different valid value in one of its array element.

| Algorithm 3 Genetic algorithm |
| --- |
| 1: FUNCTION Genetic Algorithm<br>2: BEGIN<br>3: Time t<br>4: Population P(t) := new random Population<br>5:<br>6: while ! done do<br>7:    recombine and/or mutate P(t)<br>8:    evaluate(P(t))<br>9:    select the best P(t + 1) from P(t)<br>10:    t := t + 1<br>11: end while<br>12:<br>13: return best member of P(t)<br>14: END |

Simulated annealing (SA) is another randomized searcher, which is an algorithm that explores the solution space over a series of iterations in a manner similar to RAND, as shown in Algorithm 4. An initial candidate is chosen as the best solution, and a subsequent candidate is then derived from the best solution so that this new candidate is a local neighbor. At this point, the new candidate evaluation metric is compared with the best solution so far, with the winner being chosen as the best solution for the next iteration. The key point with simulated annealing is that with some probability, a candidate can be chosen as the current best solution even if its evaluation metric is worse than its immediate competitor. This probability is largest at the start and decreases over the iterations, with the end result being that the algorithm explores a large portion of the solution space early but then focuses only on the clear winners late. Simulated annealing draws inspiration from a metallurgical thermodynamic process of heating a metal to allow atoms to move about with high energy and then letting it to cool to allow the atoms to settle into a lower-energy configuration.

| Algorithm 4 Simulated annealing |
| --- |
| 1: FUNCTION Simulated Annealing<br>2: BEGIN<br>3: Solution best := new random Solution<br>4: Temperature T := INITIALTEMPERATURE<br>5:<br>6: while T < TEMPERATUREFLOOR do<br>7:    Solution current := best.GetNeighbor( )<br>8:    if (current.score < best.score) then<br>9:        best := current<br>10:    else<br>11:        if (ProbabilisiticallyPick(T)) then<br>12:            best := current<br>13:        end if<br>14:    end if<br>15:    T := DecayTemperature(T)<br>16: end while<br>17:<br>18: return best<br>19: END |

Thus, the system 100 of FIG. 1 supports the execution model described above and provides a suite of random search algorithms discussed above: i.e., HC, SA, RAND, and GA. In example implementations, the random search algorithms HC, SA, RAND, and GA initially produce modest results when run with a large search space (e.g., on the order of 100 servers and 1000 jobs). To improve their execution, each of these algorithms may be primed with an initial candidate solution taken to be the result of the GREEDY algorithm.

As described above with respect to FIG. 1, the evaluation module 118 may provide an evaluation function that is a common component used by all the placement algorithms 116 (EXH, GREEDY, RAND, HC, GA, and SA) that returns a metric for the workload as a whole. As mentioned previously, two example workload metrics may be used, e.g., the makespan and the aggregate business value.

To calculate the overall makespan, each server's completion time is calculated using the pseudocode in Algorithm 5 below, and the maximum completion time is returned as the workload makespan. Analogously, to calculate the overall business value, each server's aggregate business value is calculated using the pseudocode in Algorithm 6 below, and the sum of the business values across all servers is returned as the aggregate business value.

Both functions execute in the following manner. Each server receives a list of tasks from the schedule placement. When assuming jobs are assigned to a server, all of the jobs' tasks are provided in this list. The list of tasks are initially sorted by topological order to preserve the DAG relationship among the tasks. For every task in the list of tasks, the task's required external data objects are downloaded into a cache if they are not already there, incurring network transmission delay. Once the external data is available along with data from any upstream tasks in the DAG, the current task executes and produces output, which can then be read by the downstream consuming task(s).

| Algorithm 5 Evaluation function for workload running time (makespan) |
|---|
| 1: FUNCTION ObjectiveFunctionMakespan |
| 2: IN: JobList jobs |
| 3: BEGIN |
| 4: TaskList tasks := jobs.tasks |
| 5: ServerCompletionTime T := overallTime |
| 6: |
| 7: TopologicalSort(tasks); |
| 8: |
| 9: for (each task in tasks) do |
| 10:     DataObjects needed_data = task.needed_data |
| 11:     for (each data_object in needed_data) do |
| 12:         if (!Cached(data_object) then |
| 13:             DownloadAndCache(data_object) |
| 14:         end if |
| 15:     end for |
| 16:     task.consumeAndProcess(needed_data) |
| 17:     task.consumeUpstreamData( ) |
| 18:     overall_time += task.completionTime |
| 19: end for |
| 20: |
| 21: return overall_time |
| 22: END |

| Algorithm 6 Evaluation function for business value |
|---|
| 1: FUNCTION ObjectiveFunctionBusiness Value |
| 2: IN: JobList jobs |
| 3: BEGIN |

| Algorithm 6 Evaluation function for business value |
|---|
| 4: TaskList tasks := jobs.tasks |
| 5: ServerBusinessValue overall_business_value |
| 6: |
| 7: TopologicalSort(tasks); |
| 8: |
| 9: for (each task in tasks) do |
| 10:     DataObjects needed_data = task.needed_data |
| 11:     for (each data_object in needed_data) do |
| 12:         if (!Cached(data_object) then |
| 13:             DownloadAndCache(data_object) |
| 14:         end if |
| 15:     end for |
| 16:     task.consumeAndProcess(needed_data) |
| 17:     task.consumeUpstreamData( ) |
| 18:     if (task.completionTime ≤ task.softDeadline) then |
| 19:         {task.alpha is a postive reward} |
| 20:         overall_business_value += task.alpha |
| 21:     else if (task.completionTime > task.softDeadline AND task.completionTime ≤ task.hardDeadline) then |
| 22:         {task.beta is a negative penalty} |
| 23:         overall_business_value += task.beta |
| 24:     else |
| 25:         {task.gamma is a negative penalty} |
| 26:         overall_business_value += task.gamma |
| 27:     end if |
| 28:     overall_time += task.completionTime |
| 29: end for |
| 30: |
| 31: return overall_business_value |
| 32: END |

Figure 5:
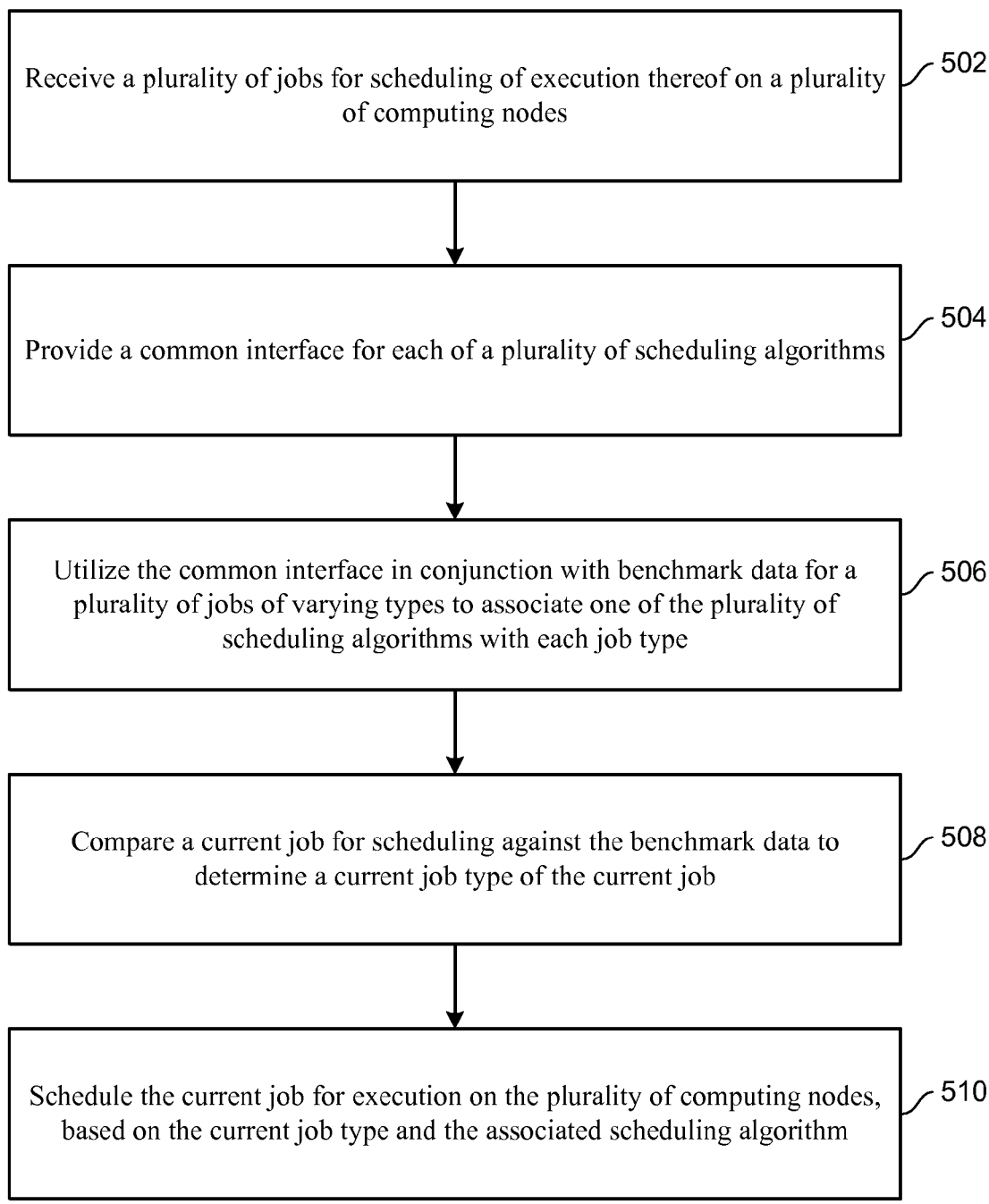
FIG. 5 is a flowchart illustrating example operations of the system of FIG. 1.

FIG. 5 is a flowchart 500 illustrating example operations of the system 100 of FIG. 1. Although the example of FIG. 5 illustrates operations 502-510 as sequential, separate operations, it may be appreciated that the operations 502-510 may be executed in a different manner than specifically illustrated in the specific example of FIG. 5. For example, two or more of the operations 502-510 may be executed in a partially or completely overlapping or parallel manner. Further, the operations 502-510 may be executed in a nested, looped, or iterative fashion. Still further, additional or alternative operations may be included, and one or more operations may be removed.

In the example of FIG. 5, a plurality of jobs may be received for scheduling of execution thereof on a plurality of computing nodes (502). For example, the scheduler 112 (or 220) may be configured to receive the jobs 110 for distribution among computing nodes including the servers 106A, 106B, . . . 106N.

A common interface may be provided for each of a plurality of scheduling algorithms (504). For example, the evaluation module 118 may provide a common interface for any and all of the algorithms 116.

The common interface may be utilized in conjunction with benchmark data for a plurality of jobs of varying types, to thereby associate one of the plurality of scheduling algorithms with each job type (506). For example, the algorithm selector 122 may utilize the evaluation module in conjunction with the benchmark data 120 to associate at least one for the algorithms with each determined job type. As described, the benchmark data 120 may further be used to associate each of the plurality of scheduling algorithms with other characteristics of operations of the scheduler 112, such as, e.g., a number of jobs to be distributed and/or a number of currently-available computing nodes (e.g., servers).

A current job for scheduling may be compared against the benchmark data to determine a current job type of the current job (508). For example, the job comparator 124 may be configured to compare a current plurality of the jobs 110 relative to the benchmark data 120, so as to thereby determine one or more current job types of the current plurality of jobs.

The current plurality of jobs may be scheduled for execution on the plurality of computing nodes, based on the current job type and the associated scheduling algorithm (510). For example, the evaluation module 118 may be configured to schedule the plurality of current jobs 110 for an execution on the servers 106A, 106B, . . . 106N, using a selected algorithm from the plurality of scheduling algorithms 116.

Figure 6:
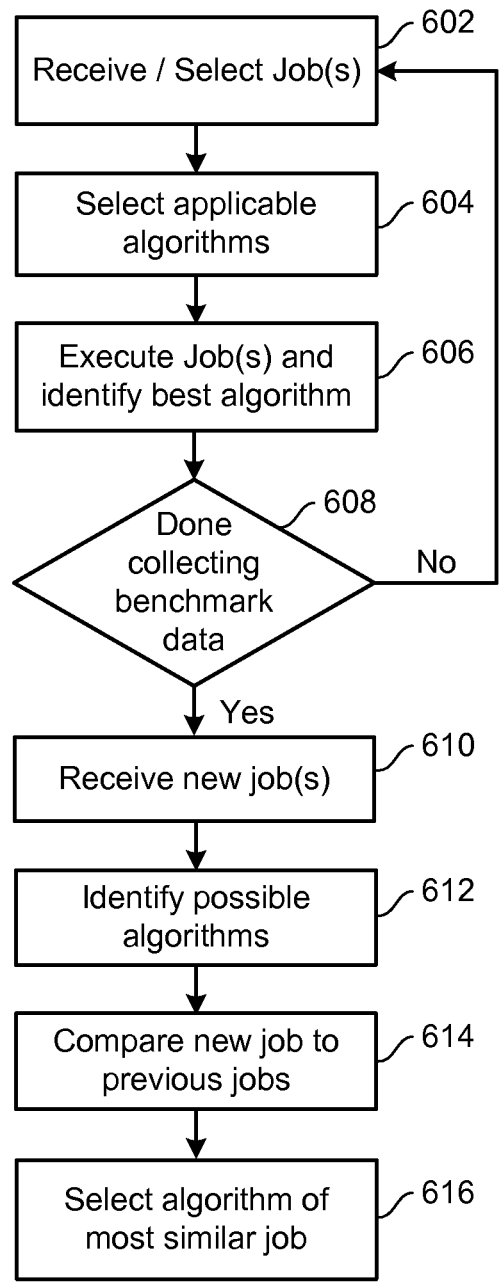
FIG. 6 is a more detailed flowchart illustrating additional example operations of the system of FIG. 1.

FIG. 6 is a flowchart 600 illustrating more detailed example operations of the system 100 of FIG. 1. In the example of FIG. 6, a plurality of jobs may be received/selected by the scheduler 112 (602). The algorithm selector 122 may select applicable algorithms from the algorithm 116 for processing of the received/selected jobs (604). Subsequently, each of the selected algorithms may be used to schedule and ultimately execute the jobs, and the algorithm selector 122 may identify the optimal algorithm of the selected algorithms (606).

In this way, as described herein, benchmark data may be collected which characterizes jobs for distribution and related data. In the example of FIG. 6, if an insufficient amount of benchmark data has been collected (608), then operations 602-606 may continue until sufficient benchmark data is collected. For example, the algorithm selector 122 may be configured to determine that a certain quantity or quality of the benchmark data 120 has been collected, and is sufficient for future operations of the job comparator 124 in selecting algorithms for current and future sets of jobs.

Thus, as new jobs are received (610), the algorithm selector 122 may perform an initial filtering of the available algorithms 116 to remove algorithms from further consideration which are not suitable for the newly received jobs (612). For example, sets of jobs of a certain size may exceed a threshold associated with potential use of an exhaustive algorithm.

Subsequently, the job comparator 124 may be configured to compare the new job(s) to previous jobs and associated data within the benchmark data 120 (614). For example, the job comparator 124 may be configured to extract features from, or associated with, the new job(s) and to thereafter classify the new job(s) based thereon. For example, in addition to other examples provided herein, exemplary features that may be used to represent the new job(s) may include, but are not limited to, data cardinality of each task of the job(s), a degree of fan-in and/or fan-out of each task of each task of the new job(s), operator names of each task of the new job(s), and/or a topological ordering of the tasks of the new job(s).

In this way, the algorithm selector 122 may select an algorithm of the algorithms 116 which was previously utilized in a successful manner in conjunction with the most similar jobs of the benchmark data 120 (616). That is, for example, the algorithm selector 122 may implement a machine learning classifier algorithm to identify a best-suited algorithm of the algorithms 116.

In this way, the evaluation module 118 may proceed to utilize the selected algorithm, using the common interface of the evaluation module 118, to thereby obtain an actual job distribution to be used in scheduling the new jobs (618). Once such scheduling has been completed, the task scheduler 126 may be configured to further arrange tasks of the distributed jobs on each server in a manner which minimizes server delays associated with attempted executions of the distributed tasks (620). Example operations of the task scheduler 126 in this regard are described below in more detail with respect to FIGS. 7 and 8.

More specifically, as referenced above, it may be appreciated that upon operations of the evaluation module 118 in providing a distribution of the jobs 110, each computing node (e.g., each server 106A, 106B, . . . 106N) contains a specific number of assigned jobs and the various tasks of each job, where each job has its task topologically sorted so that by the time a specific task is ready to execute, all of its data input dependencies have been resolved. That is, all needed data has been staged either from upstream tasks and/or from data objects that have been placed into an external data object cache. Although this approach fixes the ordering of each job's tasks, the approach also allows tasks from different jobs to be run in an intermingled order. Thus, tasks may be sequentially executed, or, in additional or alternative implementations, parallelism may be allowed so that tasks may execute while external data objects are being downloaded into the relevant external data object cache. Then, during the time that an external object is being downloaded, there may be a gap in execution since the task awaiting the object is blocked. As described, rather then experiencing this gap as an overall delay, the task scheduler 124 may be utilized to allow other tasks to run at that time. Specifically, as described in detail below, the task scheduler 124 may execute its own search space algorithm to find an optimal or near optimal ordering that will identify a task sequence (out of a space of all permissible sequence permeations) that utilizes the above-described execution gaps.

In particular, the task scheduler 124 may utilize any appropriate one or more of the algorithms 116 to find the optimal or near optimal ordering (e.g., one or more of a genetic algorithm, a greedy algorithm, a simulated annealing algorithm, and/or a hill climbing algorithm). However, as may be appreciated from the above description, the various algorithms 116 are implemented to perform searches through a discrete search space, whereas the scheduling of tasks into execution gaps as described above represent scheduling with respect to a continuous, non-discrete time span. Thus, in the specific examples of FIGS. 7-8, the attached scheduler 124 may be configured to consider an available execution time span in a discretized manner which enables utilization of a desired one of the algorithms 116, e.g., the genetic algorithm described above.

Figure 7:
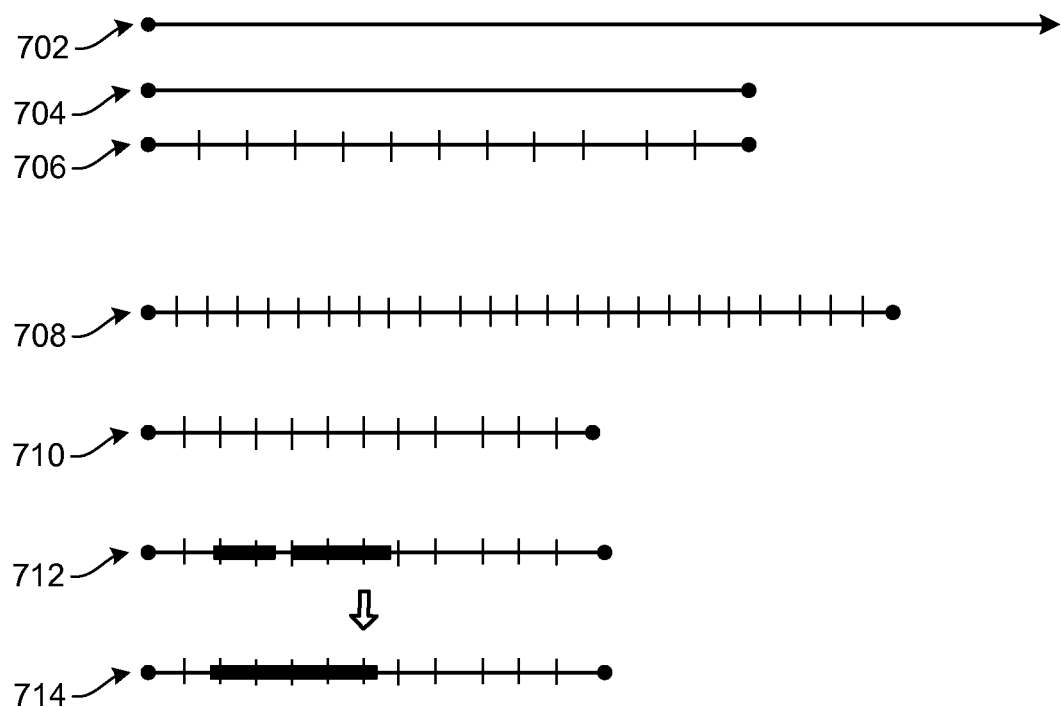
FIG. 7 is a series of graphs illustrating a technique for task scheduling on a node once job scheduling has completed.

Thus, in the example of FIG. 7, a timeline 702 illustrates the nature of the above-described problem, i.e., scheduling sequences of tasks within an open, continuous time period containing an infinite number of points, and possibly failing to identify a specific N time point beyond which tasks may not be placed.

Thus, timeline 704 illustrates identification of an end time point, while timeline 706 illustrates a subsequent division of the time span of the timeline 704 into specific time execution units. For example, the timeline 706 might be understood to represent one minute per illustrated time unit.

In the example of the timeline 706, the various time units and the end point may be selected to represent the tightest packing of all the tasks together, i.e., representing a minimum time span in which the tasks can run, and assuming that each task begins execution at the start of a time execution unit. That is, in an initial iteration, the timeline 706 may be defined on the initial assumption that no execution gaps associated with delays associated with downloading external data objects will be necessary.

Thus, the task scheduler 124 may implement selected scheduling algorithm for scheduling the tasks within and among the various time units of the timeline 706. However, assuming the presence of execution gaps as described above, the task scheduler 124 may be unable to define an appropriate solution. Consequently, as illustrated in the example of the timeline 708, a new, further end point of time may be selected in order to enlarge the available search space, and/or the fixed length of each execution time slot may be made smaller, so that again more potential schedules may be considered. In other words, by expanding the time span to produce gaps where downloading of external data objects may occur, tasks may be swapped into the gaps in order to create a more optimized schedule. The downloading gaps may occur anywhere in time along the timeline 708, as long as each gap comes before an execution of a corresponding task requiring the downloaded data. Thus, the selected search algorithm may be utilized to explore such variations in the time span of the timeline 708.

Subsequently, as described above with respect to the timeline 708, an end time point may continually be extended and/or execution time units may be made smaller, until the search algorithm returns an acceptable solution. In so doing, however, it may occur that the end time point is unnecessarily extended beyond an optimal point required for minimizing an overall execution time of the tasks while nonetheless taking advantage of any execution gaps. Similarly, it may occur that the execution time units may be made smaller than required.

Consequently, as illustrated with respect to a timeline 710, once a solution is found by the task scheduler 124 using the appropriate scheduling algorithm, a new, earlier end time point may be selected in order to make the search space smaller, and/or the execution time units may be made larger in order to decrease a number of potential schedules that may be considered.

Similarly as described above, such manipulations of the end time point and/or execution time units in an opposite direction may result in an un-workability of the search algorithm, thereby defining a bound and requiring further adjustments within the thus-bounded search space, as illustrated in the example timeline 712, 714, to thereby obtain a final solution.

In specific example implementations, an optimal time span may be found through a binary search. For example, T may be understood to represent a time span resulting from the tightest packing of tasks, e.g., corresponding to the timeline 706. Then, subsequent timelines, e.g., the timeline 708, may be defined as multiples 2T, 4T, 8T . . . of the original time span T. In this way, iterations through a binary search may proceed until the time span is located in which the gaps may be scheduled and the tasks may be placed into the gaps as part of a feasible task execution plan for a node in question. Then, as described above with respect to the timeline 710, once a candidate time span is found where a feasible execution schedule exists, refinements to the time span may be made by performing a further binary search between the current time span and the time span from a previous iteration.

Figure 8:
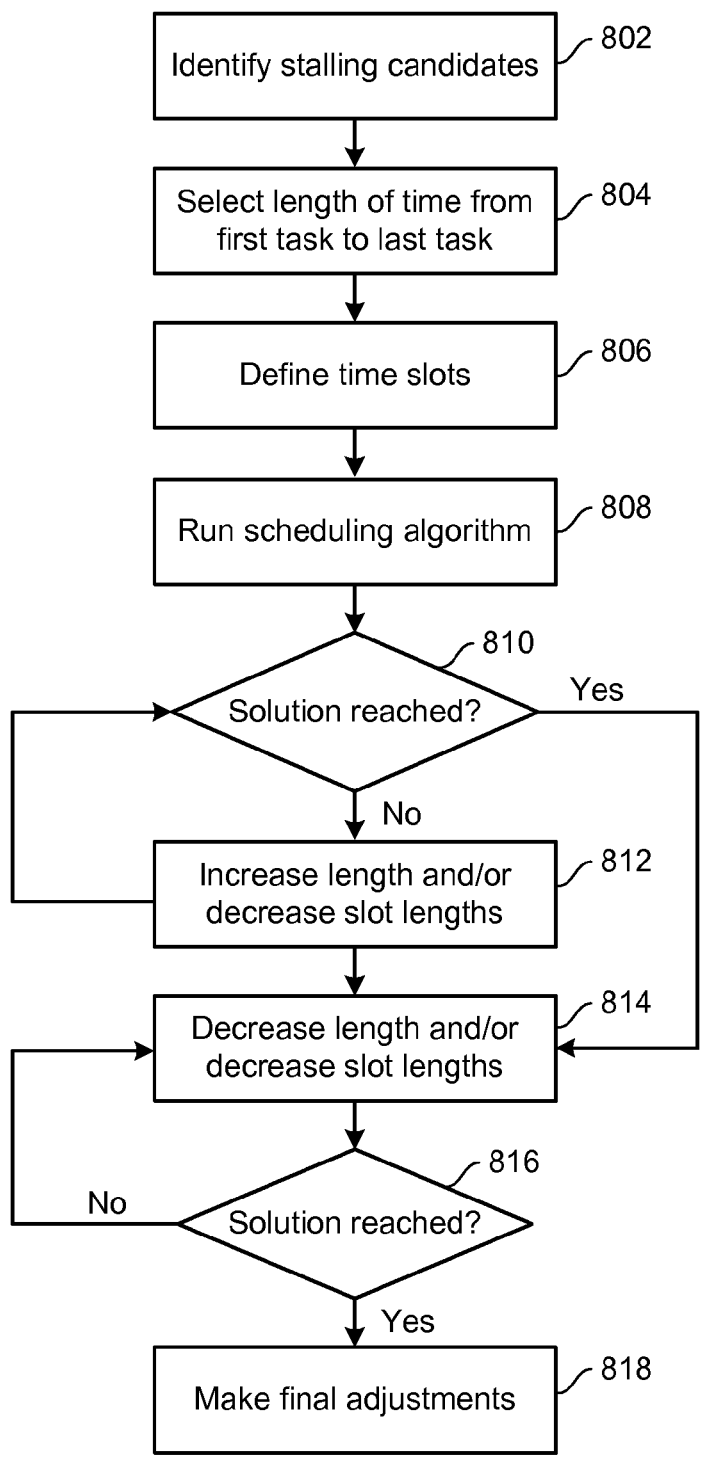
FIG. 8 is a flowchart illustrating example operations corresponding to FIG. 7.

FIG. 8 is a flowchart 800 illustrating a detailed example implementation of the task scheduler 124 with respect to examples of FIG. 7 as described above. In the example of FIG. 8, tasks of a job scheduled for execution on a particular computing node may be analyzed to identify potential stalling candidates (802). For example, tasks of various jobs scheduled for execution on the server 106A may be analyzed to identify tasks which require access to external data 114 in order to proceed, and which therefore represent stalling candidates since such tasks may stall due to a latency or unavailability of the network data 114.

A length of time from a first task to a last task may be selected (804), as described above with respect to the timeline 704. Subsequently, execution time slots for the defined timeline may be further defined (806), as illustrated with respect to the timeline 706.

As described above, the search may be bootstrapped by initially assuming a tightest-possible packing of the tasks within the timeline 706, and the selected scheduling algorithm may be executed (808). If a solution is not reached (810), then the length of the time span may be increased and/or the lengths of the execution time slots may be decreased (812), as illustrated above with respect to the timeline 708. Specifically, as in the example provided above, a binary search may be conducted in which the length of the time span may be doubled.

In this way, as described above, execution gaps associated with the identified stalling candidates may be included within possible scheduling solutions considered by the selected scheduling algorithm during a subsequent execution thereof (808). If a solution which includes the desired execution gaps is still not reached (810), then adjustments to increase the time span length and/or decrease the time slot lengths may continue (812), until an execution of the scheduling algorithm (808), results in the reaching of a feasible scheduling solution (810). Again, in the specific example provided above, a binary search may be executed in which the time span length is doubled and/or in which the execution time slot length is halved at each iteration.

Once a solution is reached (810), then the time span length may be decreased and/or the slot lengths may be increased (814). The scheduling algorithm may be executed again (815), in order to determine whether a feasible solution may be reached (816).

If a feasible solution may still be reached even with the decreased time span length and/or increased time slot lengths (816), then continued decreases in time span lengths and/or increases in time slot lengths may continue (814), until execution of the scheduling algorithm (815), determines that lengths have been reached at which no feasible solution exists (816). In other words, iterations may continue until a bound is reached.

In this way, bounds may be established which define a range in which an optimal solution exists, so that any desired final adjustments (818) may be made within the thus-defined range. In particular, for example, a further binary search may be performed within the defined range in order to quickly narrow possible task schedules and identify an optimal or near optimal task schedule which considers the presence of execution gaps due to requirements for the use of network data.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A computer system including instructions recorded on a computer-readable medium and executable by at least one processor, the system comprising:

a scheduler configured to cause the processor to receive a plurality of jobs for scheduling of execution thereof on a plurality of computing nodes;

an evaluation module configured to cause the processor to provide a common interface for each of a plurality of scheduling algorithms;

an algorithm selector configured to cause the processor to utilize the evaluation module in conjunction with benchmark data for a plurality of jobs of varying types to associate one of the plurality of scheduling algorithms with each job type; and a job comparator configured to cause the processor to compare a current job for scheduling against the benchmark data to determine a current job type of the current job, wherein the evaluation module is further configured to schedule the current job for execution on the plurality of computing nodes, based on the current job type and the associated scheduling algorithm, and wherein the system further includes a task scheduler configured to cause the at least one processor to implement, after the scheduling of the current job on a selected computing node, at least one scheduling algorithm of the plurality of scheduling algorithms to obtain a task schedule for individual tasks of the current job on the selected computing node, the task scheduler being further configured to identify a task as a stalling candidate requiring task data over a network and associated with an execution gap caused by a network delay in obtaining the task data, define a completion timeline for the task schedule including discrete time units, expand a search space for scheduling the individual tasks including one or both of increasing a length of the completion timeline or decreasing a length of the discrete time units, and execute the at least one scheduling algorithm of the plurality of scheduling algorithms, including using the execution gap to schedule a separate task of a separate job being executed in parallel with the current job, to thereby obtain the task schedule.

2. The system of claim 1, wherein the plurality of scheduling algorithms includes a genetic algorithm.

3. The system of claim 1, wherein the plurality of scheduling algorithms includes a greedy algorithm.

4. The system of claim 1, wherein the plurality of scheduling algorithms includes a simulated annealing algorithm.

5. The system of claim 1, wherein the plurality of scheduling algorithms includes a hill climbing algorithm.

6. The system of claim 1, wherein the evaluation module is configured to schedule the plurality of jobs on the plurality of computing nodes including minimizing a makespan associated with completion of the plurality of jobs.

7. The system of claim 1, wherein the evaluation module is configured to schedule the plurality of jobs on the plurality of computing nodes including maximizing a utilization of the plurality of computing nodes.

8. The system of claim 1, wherein the algorithm selector is configured to use a representative workload of jobs together with the evaluation module and the plurality of algorithms to construct the benchmark data.

9. The system of claim 8, wherein the benchmark data includes performance data related to computing operations performed in accordance with schedules implemented with each of the scheduling algorithms and the representative workload.

10. The system of claim 1 wherein each job of the plurality of jobs includes a plurality of ordered tasks, and wherein at least some tasks of the ordered tasks receive data from preceding ordered tasks and/or from external data sources that are external to the ordered tasks.

11. The system of claim 1, wherein the job comparator is configured to compare the current job based on a job name thereof.

12. The system of claim 1, wherein the task scheduler is further configured to determine that a first expansion of the search space does not provide an acceptable task schedule, and to thereafter further expand or decrease the search space to thereby obtain the task schedule.

13. The system of claim 12, wherein the task scheduler is configured to further expand or decrease the search space in an iterative manner including expanding the search space until a feasible task schedule is reached, and then decreasing the search space until a non-feasible task schedule is reached, until the task schedule is obtained.

14. The system of claim 12, wherein the task scheduler is configured to implement the at least one scheduling algorithm including implementing one or more of a genetic algorithm, a greedy algorithm, a simulated annealing algorithm, and/or a hill climbing algorithm.

15. The system of claim 1, wherein the evaluation module is further configured to cause the at least one processor to construct the benchmark data at least in part by testing individual jobs of the plurality of jobs of varying types against individual ones of the plurality of scheduling algorithms, using the common interface as a middleware for the testing.

16. The system of claim 15, wherein the algorithm selector is configured to cause the at least one processor to implement a machine learning classifier algorithm to associate one of the plurality of scheduling algorithms with each job type, and wherein the job comparator is configured to cause the at least one processor to compare the current job and determine the current job type, based on the machine learning classifier algorithm.

17. A computer-implemented method, comprising:
receiving a plurality of jobs for scheduling of execution thereof on a plurality of computing nodes;
providing a common interface for each of a plurality of scheduling algorithms;
utilizing the common interface in conjunction with benchmark data for a plurality of jobs of varying types to associate one of the plurality of scheduling algorithms with each job type;
comparing a current job for scheduling against the benchmark data to determine a current job type of the current job;
scheduling the current job for execution on the plurality of computing nodes, based on the current job type and the associated scheduling algorithm; and
implementing, after the scheduling of the current job on a selected computing node, at least one scheduling algorithm of the plurality of scheduling algorithms to obtain a task schedule for individual tasks of the current job on the selected computing node, including
identifying a task as a stalling candidate requiring task data over a network and associated with an execution gap caused by a network delay in obtaining the task data,
defining a completion timeline for the task schedule including discrete time units,
expanding a search space for scheduling the individual tasks including one or both of increasing a length of the completion timeline or decreasing a length of the discrete time units, and
executing the at least one scheduling algorithm of the plurality of scheduling algorithms, including using the execution gap to schedule a separate task of a separate job being executed in parallel with the current job, to thereby obtain the task schedule.

18. The method of claim 14, wherein the plurality of scheduling algorithms includes three or more of a genetic algorithm, a greedy algorithm, a simulated annealing algorithm, and/or a hill climbing algorithm.

19. The method of claim 17, comprising using a representative workload of jobs together with the common interface and the plurality of algorithms to construct the benchmark data.

20. The method of claim 19, wherein the benchmark data includes performance data related to computing operations performed in accordance with schedules implemented with each of the scheduling algorithms and the representative workload.

21. A computer program product, the computer program product being tangibly embodied on a non-transitory computer-readable storage medium and comprising instructions that, when executed by at least one processor, are configured to:
receive a plurality of jobs for scheduling of execution thereof on a plurality of computing nodes;
provide a common interface for each of a plurality of scheduling algorithms;
utilize the common interface in conjunction with benchmark data for a plurality of jobs of varying types to associate one of the plurality of scheduling algorithms with each job type;
compare a current job for scheduling against the benchmark data to determine a current job type of the current job;
schedule the current job for execution on the plurality of computing nodes, based on the current job type and the associated scheduling algorithm; and
implement, after the scheduling of the current job on a selected computing node, at least one scheduling algorithm of the plurality of scheduling algorithms to obtain a task schedule for individual tasks of the current job on the selected computing node, including
identifying a task as a stalling candidate requiring task data over a network and associated with an execution gap caused by a network delay in obtaining the task data,
defining a completion timeline for the task schedule including discrete time units,
expanding a search space for scheduling the individual tasks including one or both of increasing a length of the completion timeline or decreasing a length of the discrete time units, and
executing the at least one scheduling algorithm of the plurality of scheduling algorithms, including using the execution gap to schedule a separate task of a separate job being executed in parallel with the current job, to thereby obtain the task schedule.

22. The computer program product of claim 21, wherein the instructions, when executed, are further configured to determine that a first expansion of the search space does not provide an acceptable task schedule, and to thereafter further expand or decrease the search space to thereby obtain the task schedule.

23. The computer program product of claim 22, wherein the instructions, when executed, are further configured to further expand or decrease the search space in an iterative manner including expanding the search space until a feasible task schedule is reached, and then decreasing the search space until a non-feasible task schedule is reached, until the task schedule is obtained.

* * * * *